United States Patent
Kang et al.

(10) Patent No.: US 12,453,736 B2
(45) Date of Patent: Oct. 28, 2025

(54) FRAGRANCE COMPOSITIONS AND USE THEREOF FOR IMPROVING SLEEP

(71) Applicant: TAKASAGO INTERNATIONAL CORPORATION, Tokyo (JP)

(72) Inventors: Raphael K. L. Kang, Leonia, NJ (US); Alba T. Cilia, Township of Washington, NJ (US); Louis J. Lombardo, Washingtonville, NY (US)

(73) Assignee: TAKASAGO INTERNATIONAL CORPORATION, Tokyo (JP)

( * ) Notice: Subject to any disclaimer, the term of this patent is extended or adjusted under 35 U.S.C. 154(b) by 277 days.

(21) Appl. No.: 17/041,214

(22) PCT Filed: Apr. 1, 2019

(86) PCT No.: PCT/US2019/025257
§ 371 (c)(1),
(2) Date: Sep. 24, 2020

(87) PCT Pub. No.: WO2019/191782
PCT Pub. Date: Oct. 3, 2019

(65) Prior Publication Data
US 2021/0008082 A1 Jan. 14, 2021

Related U.S. Application Data

(60) Provisional application No. 62/650,510, filed on Mar. 30, 2018.

(51) Int. Cl.
| | |
|---|---|
| A61K 31/618 | (2006.01) |
| A61B 5/00 | (2006.01) |
| A61K 9/00 | (2006.01) |
| A61K 31/045 | (2006.01) |
| A61K 31/11 | (2006.01) |
| A61K 31/12 | (2006.01) |
| A61K 31/122 | (2006.01) |
| A61K 31/216 | (2006.01) |
| A61K 31/22 | (2006.01) |
| A61K 31/343 | (2006.01) |
| A61P 25/20 | (2006.01) |

(52) U.S. Cl.
CPC .......... *A61K 31/618* (2013.01); *A61B 5/0048* (2013.01); *A61B 5/4812* (2013.01); *A61K 9/0043* (2013.01); *A61K 31/045* (2013.01); *A61K 31/11* (2013.01); *A61K 31/12* (2013.01); *A61K 31/122* (2013.01); *A61K 31/216* (2013.01); *A61K 31/22* (2013.01); *A61K 31/343* (2013.01); *A61P 25/20* (2018.01)

(58) Field of Classification Search
CPC ............................ A61K 31/168; A61K 31/618
See application file for complete search history.

(56) References Cited

U.S. PATENT DOCUMENTS

| | | | |
|---|---|---|---|
| 2004/0242452 A1* | 12/2004 | Shoji .................... | A61K 31/085 512/1 |
| 2015/0190607 A1 | 7/2015 | Sugio et al. | |
| 2018/0051231 A1* | 2/2018 | Kontaris ................... | C11B 9/00 |

FOREIGN PATENT DOCUMENTS

| | | |
|---|---|---|
| JP | 2003-119490 A | 4/2003 |
| JP | 2007-197334 A | 8/2007 |
| JP | 2007-252777 A | 10/2007 |
| JP | 2008-247894 A | 10/2008 |
| JP | 2013-006791 A | 1/2013 |
| JP | 2018-508634 A | 3/2018 |
| WO | WO 2010/036700 A1 | 4/2010 |
| WO | WO 2011/152007 A1 | 12/2011 |
| WO | WO 2018/005839 A1 | 1/2018 |

OTHER PUBLICATIONS

Fismer, Lavender and sleep: A systematic review of the evidence, European Journal of Integrative Medicine 4 (2012) e436-e447.*
Fismer et al., "Lavender and sleep: A systematic review of the evidence," European Journal of Integrative Medicine, 4(4):e436-e447 (2012).
Hur et al., "Aromatherapy for stress reduction in healthy adults: a systematic review and meta-analysis of randomized clinical trials," Maturitas, Elsevier, Amsterdam, NL, 79(4):362-369 (2014).
International Search Report and Written Opinion mailed Aug. 29, 2019 in International Application No. PCT/US2019/025257 (21 pages).
Montgomery-Downs et al., "Movement toward a novel activity monitoring device," Sleep Breath, 16:913-917 (2012).

* cited by examiner

*Primary Examiner* — Svetlana M Ivanova
(74) *Attorney, Agent, or Firm* — Baker Botts L.L.P.

(57) ABSTRACT

Fragrance compositions comprising one or more fragrance compounds for use in increasing the duration of sleep and/or improving quality of sleep in a subject is disclosed. Fragrance compositions comprising one or more fragrance compounds for use in increasing the quality of sleep in a subject (i.e., an increase in the time the subject is asleep during the night, a decrease in the time the subject is awake during the night, an increase in the time the subject experiences REM sleep, an increase in the time the subject experiences deep sleep, an increase in the time the subject experiences light sleep; and an increase in overall sleep efficiency) is disclosed. The composition can be incorporated into various consumer end products.

9 Claims, No Drawings

FRAGRANCE COMPOSITIONS AND USE THEREOF FOR IMPROVING SLEEP

CROSS-REFERENCE TO RELATED APPLICATIONS

This application is a U.S. National Stage Patent Application under 35 U.S.C. § 371 of International Patent Application No. PCT/US2019/025257, filed on Apr. 1, 2019, which claims priority to U.S. Provisional Patent Application Ser. No. 62/650,510, filed on Mar. 30, 2018, the contents of each of which are hereby incorporated by reference in their entireties.

FIELD

The present disclosure relates to fragrance compositions that can be administered to influence the sleep patterns of a subject, and more specifically, increase sleep quantity and/or quality of a subject.

BACKGROUND

Sleep is important for physical and mental health and for daily functioning. Adequate sleep provides numerous benefits, including better mood, appearance, immune health, and cognitive functions. The American Academy of Sleep Medicine (AASM) recommends that adults aged 18 years or older sleep between 7 to 8 hours a night. However, sleep deprivation is a modern-age epidemic. Many people report under sleeping the suggested hours of sleep per night or otherwise thinking they do not get enough sleep. A need exists for solutions that can improve not only the quantity of sleep but the quality (i.e., efficacy) of sleep, especially safe, non-drug, non-invasive solutions.

Mankind has used odors throughout history for a multitude of purposes, including therapeutic purposes. Folk remedies of many ancient civilizations call for the use of plant and animal scents. Despite the diminished use of such therapies with the advent of modern medicine, there is clear scientific evidence confirming the effect of odors on the functioning of the autonomic nervous system as well as the neuroendocrine system. This is because they are detected by the Jacobson-organ in the nasal septum and enter directly into the limbic system, the center of the brain linked to moods and emotions, which unconsciously affects the functions of inner organs.

It is desirable to create fragrances which can be used in consumer products to influence the sleep patterns of consumers. Therefore, there remains a need to identify fragrance compounds and fragrance accords that effectively impact an individual's reaction to sleep, and to create fragrance compositions comprising such compounds and accords. The present disclosure addresses this need as disclosed in further detail below.

SUMMARY OF THE INVENTION

The present disclosure relates to fragrance compounds and compositions comprising at least one compound that effectively provides a sleep benefit to a subject. The present disclosure is also directed to fragrance compositions comprising at least one of said compounds and a method of using such fragrance compositions to increase a subject's quantity or quality of sleep.

In certain embodiments the present disclosure provides a method of identifying a fragrance accord that improves sleep, wherein the method comprises a first protocol comprising having each subject of a group of subjects smell a control fragrance accord and measuring a first set of sleep parameters of each subject of said group of subjects; a second protocol comprising having each subject of said group of subjects smell a fragrance accord to be tested, and measuring a second set of sleep parameters of each subject of said group of subjects. The sleep parameters obtained in the second protocol are then contrasted with the sleep parameters obtained in the first protocol thus identifying the fragrance accord which improves one or more of sleep parameters, wherein the one or more sleep parameters are selected from the group consisting of total minutes awake, total minutes asleep, sleep efficiency, number of REM sleep minutes, number of light sleep minutes, and number of deep sleep minutes.

In certain embodiments the present disclosure provides a method of improving at least one sleep parameter of a subject, wherein the method comprises providing a fragrance accord, and administering the fragrance accord to the subject in an amount effective to improve one or more of sleep parameters, wherein the one or more sleep parameters are selected from the group consisting of total minutes awake, total minutes asleep, sleep efficiency, number of REM sleep minutes, number of light sleep minutes, and number of deep sleep minutes. In certain embodiments, the fragrance accord comprises cis-3-hexenyl salicylate, at least one musk compound and at least one floral compound. In particular embodiments, the musk compound is selected from the group consisting of ambroxan, ambretone, L-muscone, (12E)-1-oxacyclohexadec-12-en-2-one and Musk T. In other particular embodiments, the floral compound is selected from the group consisting of myrcenol, ionone alpha, linalool, linalyl acetate, cyclamen aldehyde, dihydromyrcenol, lilial, geraniol, gamma-methyl ionone, nerol, and hedione. In yet another particular embodiment, the musk compound is selected from the group consisting of ambroxan, ambretone, L-muscone, and Musk T; and the floral compound is selected from the group consisting of myrcenol, ionone alpha, linalool, linalyl acetate, cyclamen aldehyde, dihydromyrcenol, lilial, geraniol, gamma-methyl ionone, nerol, and hedione. In certain embodiments, the fragrance accord further comprises one or more of citrus, spicy, mentholic, fruity, woody, aldehydic, herbal, balsamic, or gourmand compounds.

In another embodiment, the fragrance accord comprises beta-ionone, at least one floral compound and at least one musk compound. In certain embodiments, the floral compound is selected from the group consisting of linalool, hedione, cyclamen aldehyde, geraniol, and phenylethyl alcohol. In certain embodiments, the musk compound is selected from the group consisting of ambretone, and Musk T. In certain embodiments, the floral compound is selected from the group consisting of linalool, hedione, cyclamen aldehyde, geraniol, and phenylethyl alcohol, and the musk compound is selected from the group consisting of ambretone and Musk T.

In certain alternative embodiments, the fragrance accord comprises nectaryl and at least one floral compound. In certain embodiments, the floral compound is selected from the group consisting of dihydromyrcenol, geraniol, alpha-ionone, phenoxyethyl isobutyrate, and alpha-terpineol. In particular embodiments, the fragrance accord further comprises one or more of woody, citrus, fruity, herbal, mentholic, aldehydic or piney compounds.

In certain alternative embodiments, the fragrance accord comprises beta-ionone, at least one gourmand compound and at least one mentholic compound. In a particular embodiment, the gourmand compound is vanillin. In another particular embodiment, the mentholic compound is menthol. In certain other embodiments, the fragrance accord further comprises one or more of floral compound, spicy compound, or woody compound.

In certain embodiments, the present disclosure provides a consumer product comprising a fragrance accord, wherein the fragrance accord comprises cis-3-hexenyl salicylate, at least one musk compound and at least one floral compound. In other embodiments, the present disclosure provides a consumer product comprising a fragrance accord, wherein the fragrance accord comprises beta-ionone, at least one floral compound and at least one musk compound. In yet other embodiments, the present disclosure provides a consumer product comprising a fragrance accord, wherein the fragrance accord comprises nectaryl and at least one floral compound. In certain other embodiments, the present disclosure provides a consumer product comprising a fragrance accord, wherein the fragrance accord comprises beta-ionone, at least one gourmand compound and at least one mentholic compound.

In a particular embodiment, the present disclosure provides a consumer product wherein the fragrance accord is provided at least in part, by a fragrance delivery system, wherein said fragrance delivery system is selected from the group consisting of a Polymer Assisted Delivery (PAD) system, a Molecule-Assisted Delivery (MAD) system, a Cyclodextrin (CD) system, a Starch Encapsulated Accord (SEA) system, and a Zeolite & Inorganic Carrier (ZIC) system.

In certain embodiments, the fragrance composition comprises from about 0.001 weight % to about 100 weight % fragrance compounds.

The present disclosure also provides a consumer product comprising a fragrance composition.

The presently disclosed subject matter also provides for a method of providing a one or more sleep benefits to a subject in need thereof by administering a fragrance composition disclosed herein to the subject in an amount effective to provide one or more of the following benefits: (1) an increase in the time the subject is in asleep during the night; (2) a decrease in the time the subject is awake during the night; (3) an increase in the time the subject experiences REM sleep; (4) an increase in the time the subject experiences deep sleep; (5) increase in the time the subject experiences light sleep; and (6) increase in overall sleep efficiency. In certain embodiments, the fragrance composition is administered in the evening prior to or at the time of the subject's bedtime. In certain embodiments, the fragrance composition is administered to the subject through one or more consumer products.

DETAILED DESCRIPTION

As discussed above, there is a need in the art to identify novel fragrances and accords that effectively influence a subject's sleep patterns so as to provide an effective composition for increasing sleep duration and/or improving quality of sleep. The presently disclosed subject matter addresses this need through a fragrance composition comprising at least one compound that can be administered to a subject to effectively increase sleep duration and/or improve quality of sleep.

For clarity, and not by way of limitations, the detailed description is divided into the following subsections:
1. Definitions;
2. Fragrance Compounds;
3. Fragrance Compositions;
4. Use of Compositions in Consumer Products;
5. Increase of Sleep Quantity and Quality.

1. Definitions

The terms used in this specification generally have their ordinary meanings in the art, within the context of this disclosure and in the specific context where each term is used. Certain terms are discussed below, or elsewhere in the specification, to provide additional guidance to the practitioner in describing the compositions and methods of the disclosure and how to make and use them.

As used herein, the use of the word "a" or "an" when used in conjunction with the term "comprising" in the claims and/or the specification can mean "one," but it is also consistent with the meaning of "one or more," "at least one," and "one or more than one." Still further, the terms "having," "including," "containing" and "comprising" are interchangeable and one of skill in the art is cognizant that these terms are open ended terms.

The term "about" or "approximately" means within an acceptable error range for the particular value as determined by one of ordinary skill in the art, which will depend in part on how the value is measured or determined, i.e., the limitations of the measurement system. For example, "about" can mean within three or more than three standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within five-fold, and more preferably within two-fold, of a value.

As used herein, the term "fragrance composition" refers to a mixture comprising one or more fragrance compounds, in any of their forms, and one or more solvents or perfuming co-ingredients. As known in the art, a fragrance composition contains one or more fragrance compounds in order to impart an olfactory note to the consumer product formulation (e.g., a household cleaner, perfume, or other consumer product) to which it is added. In one embodiment, the fragrance composition contains two or more fragrance compounds which, collectively and in combination with the solvent to which they are added, impart an intended olfactory note (e.g., a hedonically pleasing "tropical" note) to a human in close proximity to the fragrance composition. In general terms, perfuming co-ingredients belong to chemical classes as varied as alcohols, aldehydes, ketones, esters, ethers, acetates, nitriles, terpene hydrocarbons, nitrogenous or sulphurous heterocyclic compounds and essential oils of natural or synthetic origin, and are known to perfumists of ordinary skill in the art. Many of these ingredients are listed in reference texts such as S. Arctander, *Perfume and Flavor Chemicals,* 1969, Montclair, New Jersey, USA or any of its more recent versions, each of which are hereby incorporated by reference.

As used herein, the term "accord" refers to a composition that contains one or more different compounds that creates a specific smell, odor or scent. One or more "accords" can be utilized as part of fragrance composition.

The phrase "sleep benefit" as used herein means one or more of the following: (1) an increase in the time the subject is asleep during the night; (2) a decrease in the time the subject is awake during the night; (3) an increase in the time the subject experiences REM sleep; (4) an increase in the time the subject experiences deep sleep; (5) increase in the time the subject experiences light sleep; and (6) increase in overall sleep efficiency.

As used herein, the term "deep sleep" refers to Stage 3 and 4 sleep, i.e., the body is less responsive to outside stimulus, breathing slows, muscles relax, and heart rate becomes more regular. Growth hormone is secreted during deep sleep.

As used herein, the term "REM sleep" refers to Rapid Eye Movement (REM) sleep, i.e., the stage of sleep when most dreaming happens. During REM sleep, the muscles (except for eye and breathing muscles) are actively paralyzed, heart rate increases, and breathing is more irregular.

As used herein, the term "sleep efficiency" refers to a sleep parameter calculated is calculated according to the formula:

$$\text{sleep efficiency} = \frac{100 * \text{total time asleep}}{\text{total time asleep} + \text{time awake} + \text{restless time during sleep}}$$

As used herein, the term "light sleep" refers to Stage 2 sleep, i.e., when people become less aware of their surroundings, body temperature drops, breathing and heart rate become more regular. Approximately 50% of total sleep is spent in this stage.

As used herein, the term "total minutes awake" refers to the time subject is briefly awake during extended period of sleep (such as nighttime).

As used herein, the term "bedtime" refers to the time at which a subject typically gets into bed in order to sleep.

As used herein, the term "subject" refers to a human or a non-human subject. Non-limiting examples of non-human subjects include non-human primates, dogs, cats, mice, rats, guinea pigs, rabbits, pigs, fowl, horses, cows, goats, sheep, cetaceans, etc.

As used herein, the term "treat" or "treating" refers to intervention to increase the quantity or quality of sleep of the subject, e.g., by administering a fragrance composition.

As used herein, the terms "reduce" and grammatical equivalents refers to decrease by at least about 2% including, but not limited to, decrease by about 2%, by about 5%, by about 10%, by about 25%, by about 30%, by about 50%, by about 75%, or by about 100%.

As used herein, the term "increase" refers to alter positively by at least about 0.05% including, but not limited to, alter positively by about 0.05%, by about 0.5%, by about 1%, by about 2%, by about 5%, by about 10%, by about 25%, by about 30%, by about 50%, by about 75%, or by about 100%.

As used herein, the term "administering" refers to introducing or delivering to a subject a compound to perform its intended function. Administration can be by inhalation, smelling, inbreathing. Administering or administration includes self-administration and the administration by another.

As used herein, the phrase "consumer product" or "end product" refers to composition that is in a form ready for use by the consumer for the marketed indication. A solvent suitable for use in a consumer product is a solvent that, when combined with other components of the end product, will not render the consumer product unfit for its intended consumer use.

2. Fragrance Compounds

The fragrance compositions of the presently disclosed subject matter comprise one or more fragrance compounds. Although structurally diverse, each fragrance compound gives an odor, and the various compounds can be used alone or in combination. Because of their pleasant odor character, fragrance compounds can be incorporated into various product applications. Surprisingly, the subject disclosure explains that it has been unexpectedly discovered that certain compounds act on the autonomic nervous system or the hypothalamus-pituitary-adrenal (HPA) axis or the ventrolateral preoptic nucleus and/or suprachiasmatic nucleus to effectively increase the quantity of sleep and/or increase the quality of sleep.

Fragrance compounds that can effectively increase the quantity and/or quality of sleep can include, but are not limited to, beta-ionone, alpha-ionone, L-Muscone, vanillin, Musk T, 5-cyclohexadecen-1-one (Ambretone®), (3aR,5aS,9aS,9bR)-3a,6,6,9a-tetramethyl-2,4,5,5a,7,8,9,9b-octahydro-1H-benzo[e][1]benzofuran (Ambroxan®), lilial, geraniol, cis-3-hexenyl salicylate, gamma-methyl ionone (Isoraldeine® 70), linalool, L-menthol, linalyl acetate, cyclamen aldehyde, dihydromyrcenol, nerol, phenoxyethyl isobutyrate, and combinations thereof.

In certain embodiments, the present disclosure provides fragrance compounds that can effectively increase the quantity of sleep by increasing time asleep include without limitation, cyclamen aldehyde, dihydromyrcenol, geraniol, alpha-ionone, lilial, nerol, and combinations thereof.

In certain embodiments, the present disclosure provides fragrance compounds that can effectively increase the quantity of sleep by decreasing time awake during the night, including without limitation, beta-ionone, Musk T, linalyl acetate, (3aR,5aS,9aS,9bR)-3a,6,6,9a-tetramethyl-2,4,5,5a,7,8,9,9b-octahydro-1H-benzo[e][1]benzofuran (Ambroxan®), cyclamen aldehyde, and combinations thereof.

In yet other embodiments, the present disclosure provides fragrance compounds that can effectively increase the quantity of sleep by both increasing time asleep and decreasing time awake, including without limitation, cyclamen aldehyde.

In certain embodiments, the present disclosure provides fragrance compounds that can effectively increase the quality of sleep by increasing REM sleep, including without limitation, dihydromyrcenol, lilial, linalyl acetate, vanillin, and combinations thereof.

In certain embodiments, the present disclosure provides fragrance compounds that can effectively increase the quality of sleep by increasing deep sleep, including without limitation, cis-3-hexenyl salicylate, cyclamen aldehyde, dihydromyrcenol, geraniol, alpha-ionone, linalyl acetate, L-muscone, and combinations thereof.

In yet other embodiments, the present disclosure provides fragrance compounds that can effectively increase the quality of sleep by increasing the duration of REM sleep and deep sleep, including without limitation dihydromyrcenol, linalyl acetate, and combinations thereof.

In certain embodiments, the present disclosure provides fragrance compounds that can effectively increase the quality of sleep by increasing sleep efficiency, including without limitation, cyclamen aldehyde, beta-ionone, lilial, linalyl acetate, L-menthol, Musk T, and combinations thereof.

In certain embodiments, the present disclosure provides fragrance compounds that can effectively increase the quality of sleep by increasing light sleep time, including without limitation, 5-cyclohexadecen-1-one (Ambretone®), geraniol, beta-ionone, lilial, linalool, L-menthol, gamma-methyl ionone (Isoraldeine® 70), nerol, phenoxyethyl isobutyrate, and combinations thereof.

The presently disclosed fragrance compounds can be classified into one or more of the fragrance categories (i.e., floral, fruity, gourmand, green, herbal, mentholic, musk, piney, powdery, spicy, woody, etc.) depending on the amount or level of use in a fragrance composition.

A floral compound can be cyclamen aldehyde, geraniol, dihydromyrcenol, lilial, linalool, linalyl acetate, gamma-methyl ionone, alpha-ionone, beta-ionone, nerol, phenoxyethyl isobutyrate, or combinations thereof.

A gourmand compound can be vanillin.

A green compound can be cis-3-hexenyl salicylate.

A mentholic compound can be L-menthol.

A musk compound can be 5-cyclohexadecen-1-one (Ambretone®), Musk T, L-muscone, or combinations thereof.

A woody compound can be (3aR,5aS,9aS,9bR)-3a,6,6,9a-tetramethyl-2,4,5,5a,7,8,9,9b-octahydro-1H-benzo[e][1]benzofuran (Ambroxan®), beta-ionone or combinations thereof.

In specific embodiments, the one or more compounds (taken alone or together) can make up a fragrance accord. In one embodiment, one compound can make up the accord. In another embodiment, two compounds can make up the accord. In another embodiment, three compounds can make up the accord. In another embodiment, four or more compounds can make up the accord. These accords can then be used in fragrance compositions as discussed in more detail below.

In certain embodiments, the fragrance accord can include cis-3-hexenyl salicylate, at least one musk compound and at least one floral compound. In certain embodiments, the fragrance accord can include from about 0.83% to about 25%, or from about 2% to about 20%, or from about 5% to about 15%, or from about 6% to about 12% of hexyl salicylate by weight. In certain embodiments, the fragrance accord can include from about 0.02% to about 35%, or from about 2% to about 30%, or from about 5% to about 25%, or from about 10% to about 20% of musk compounds by weight. In certain embodiments, the fragrance accord can include from about 10% to about 60%, or from about 15% to about 50%, or from about 20% to about 40%, or from about 25% to about 35% of floral compounds by weight. In particular embodiments the musk compound can be selected from the group consisting of ambroxan, ambretone, L-muscone, and Musk T. In other embodiments the floral compound can be selected from the group consisting of myrcenol, ionone alpha, linalool, linalyl acetate, cyclamen aldehyde, dihydromyrcenol, lilial, geraniol, gamma-methyl ionone, nerol, and hedione. In other embodiments, the musk compound can be selected from the group consisting of ambroxan, ambretone, L-muscone, and Musk T, and the floral compound can be selected from the group consisting of myrcenol, ionone alpha, linalool, linalyl acetate, cyclamen aldehyde, dihydromyrcenol, lilial, geraniol, gamma-methyl ionone, nerol, and hedione. In other embodiments, the fragrance accord can also comprise one or more of citrus, fruity, woody, herbal or gourmand compounds.

In certain embodiments, the fragrance accord can include beta-ionone, at least one floral compound and at least one musk compound. In certain embodiments, the fragrance accord can include from about 2% to about 30%, or from about 5% to about 25% of beta-ionone by weight. In certain other embodiments the fragrance accord can include from about 20% to about 40%, or rom about 25% to about 40% of musk compounds by weight. In other certain embodiments, the fragrance accord can include form about 40% to about 55%, or from about 45% to about 50% of floral compounds by weight. In other embodiments the floral compound can be selected from the group consisting of linalool, hedione, cyclamen aldehyde, geraniol, and phenylethyl alcohol. In other embodiments, the musk compound can be selected from the group consisting of ambretone, and Musk T. In certain embodiments, the floral compound can be selected from the group consisting of linalool, hedione, cyclamen aldehyde, geraniol, and phenylethyl alcohol, and the musk compound can be selected from the group consisting of ambretone and Musk T.

In certain embodiments, the fragrance accord can include nectaryl and at least one floral compound. In particular embodiments, the fragrance accord can comprise from about 2% to about 45%, or from about 3% to about 40% of nectaryl by weight. In other embodiments, the fragrance accord can include from about 15% to about 40%, or from about 20% to about 35% of floral compounds by weight. In certain embodiments, the floral compound can be selected from the group consisting of dihydromyrcenol, genraniol, alpha-ionone, phenoxyethyl isobutyrate, and alpha-terpineol. In another embodiment, the fragrance accord can further comprise one or more of woody, citrus, fruity, herbal, mentholic, aldehydic or piney compounds.

In certain embodiments, the fragrance accord can include beta-ionone, at least one gourmand compound and at least one mentholic compound. In certain embodiments, the fragrance accord can include from about 10% to about 15% of beta-ionone, from about 2% to about 5% of gourmand compounds, and from about 5% to about 15% of mentholic compounds by weight. In a particular embodiment, the mentholic compound can be L-menthol. In another particular embodiment, the gourmand compound can be vanillin.

In a particular embodiment, the fragrance accord can include a musk compound, cis-3-hexenyl salicylate, a floral compound, a citrus compound and a balsamic compound.

In another particular embodiment, the fragrance accord can include beta-ionone, one or more floral compounds, a mentholic compound, and a woody compound.

In certain embodiments the present disclosure provides a method of identifying a fragrance accord that improves sleep, wherein the method comprises a first protocol comprising having each subject of a group of subjects smell a control fragrance accord and measuring a first set of sleep parameters of each subject of said group of subjects; a second protocol comprising having each subject of said group of subjects smell a fragrance accord to be tested, and measuring a second set of sleep parameters of each subject of said group of subjects. The sleep parameters obtained in the second protocol are then contrasted with the sleep parameters obtained in the first protocol thus identifying the fragrance accord which improves one or more of sleep parameters, wherein the one or more sleep parameters are selected from the group consisting of total minutes awake, total minutes asleep, sleep efficiency, number of REM sleep minutes, number of light sleep minutes, and number of deep sleep minutes.

In certain embodiments the present disclosure provides a method of improving at least one sleep parameter of a subject, wherein the method comprises providing a fragrance accord, and administering the fragrance accord to the subject in an amount effective to improve one or more of sleep parameters, wherein the one or more sleep parameters are selected from the group consisting of total minutes awake, total minutes asleep, sleep efficiency, number of REM sleep minutes, number of light sleep minutes, and number of deep sleep minutes. In certain embodiments, the fragrance accord comprises cis-3-hexenyl salicylate, at least one musk compound and at least one floral compound. In particular embodiments, the musk compound is selected from the group consisting of ambroxan, ambretone, L-muscone, (12E)-1-oxacyclohexadec-12-en-2-one and Musk T. In other particular embodiments, the floral compound is selected from the group consisting of myrcenol, ionone alpha, linalool, linalyl acetate, cyclamen aldehyde, dihydromyrcenol, lilial, geraniol, gamma-methyl ionone, nerol, and hedione. In yet another particular embodiment, the musk compound is selected from the group consisting of ambroxan, ambretone, L-muscone, and Musk T; and the floral compound is selected from the group consisting of myrcenol, ionone alpha, linalool, linalyl acetate, cyclamen aldehyde, dihydromyrcenol, lilial, geraniol, gamma-methyl ionone, nerol, and hedione. In certain embodiments, the fragrance accord further comprises one or more of citrus, spicy, mentholic, fruity, woody, aldehydic, herbal, balsamic, or gourmand compounds.

In another embodiment, the fragrance accord comprises beta-ionone, at least one floral compound and at least one musk compound. In certain embodiments, the floral compound is selected from the group consisting of linalool, hedione, cyclamen aldehyde, geraniol, and phenylethyl alcohol. In certain embodiments, the musk compound is selected from the group consisting of ambretone, and Musk T. In certain embodiments, the floral compound is selected from the group consisting of linalool, hedione, cyclamen aldehyde, geraniol, and phenylethyl alcohol, and the musk compound is selected from the group consisting of ambretone and Musk T.

In certain alternative embodiments, the fragrance accord comprises nectaryl and at least one floral compound. In certain embodiments, the floral compound is selected from the group consisting of dihydromyrcenol, genraniol, alpha-ionone, phenoxyethyl isobutyrate, and alpha-terpineol. In particular embodiments, the fragrance accord further comprises one or more of woody, citrus, fruity, herbal, mentholic, aldehydic or piney compounds.

In certain alternative embodiments, the fragrance accord comprises beta-ionone, at least one gourmand compound and at least one mentholic compound. In a particular embodiment, the gourmand compound is vanillin. In another particular embodiment, the mentholic compound is menthol. In certain other embodiments, the fragrance accord further comprises one or more of floral compound, spicy compound, or woody compound.

In certain embodiments, the present disclosure provides a consumer product comprising a fragrance accord, wherein the fragrance accord comprises cis-3-hexenyl salicylate, at least one musk compound and at least one floral compound. In other embodiments, the present disclosure provides q consumer product comprising a fragrance accord, wherein the fragrance accord comprises beta-ionone, at least one floral compound and at least one musk compound. In yet other embodiments, the present disclosure provides a consumer product comprising a fragrance accord, wherein the fragrance accord comprises nectaryl and at least one floral compound. In certain other embodiments, the present disclosure provides a consumer product comprising a fragrance accord, wherein the fragrance accord comprises beta-ionone, at least one gourmand compound and at least one menthol compound.

In a particular embodiment, the present disclosure provides a consumer product wherein the fragrance accord is provided at least in part, by a fragrance delivery system, wherein said fragrance delivery system is selected from the group consisting of a Polymer Assisted Delivery (PAD) system, a Molecule-Assisted Delivery (MAD) system, a Cyclodextrin (CD) system, a Starch Encapsulated Accord (SEA) system, and a Zeolite & Inorganic Carrier (ZIC) system.

3. Fragrance Compositions

The compounds and accords of the presently disclosed subject matter can be formulated into different fragrance compositions. As discussed above, each accord contains at least one fragrance compound. A fragrance composition in accordance with the presently disclosed subject matter can include one or more, two or more, or three or more of the fragrance compounds or fragrance accords described herein.

In certain embodiments, the one or more compounds of the present disclosure can be formulated in a composition at a concentration from about 0.001% to about 100% by weight, or from about 0.01% to about 90% by weight, or from about 0.1% to about 80% by weight, or from about 1% to about 70% by weight, or from about 2% to about 60% by weight, or from about 5% to about 50% by weight, or from about 5% to about 40% by weight, or from about 5% to about 30% by weight, or from about 5% to about 20% by weight, or from about 5% to about 10% by weight of the total fragrance composition. In certain embodiments, the fragrance compositions of the present disclosure can contain at least about 5%, at least about 10%, at least about 20%, or at least about 25% by weight of a fragrance accord.

In certain embodiments, the fragrance compositions of the present disclosure can contain at least about 10% by weight of a fragrance accord, at least about 25% by weight of a fragrance accord, at least 50% by weight of a fragrance accord, at least 75% by weight of a fragrance accord, or at least 90% by weight of a fragrance accord. In one embodiment, the fragrance composition contains 100% by weight of a fragrance accord.

The compounds of the presently disclosed subject matter can be combined with one or more additional fragrance compounds from various fragrance categories so long as the addition does not change the ability of the composition to increase the quantity of sleep and/or improve the quality of sleep. In certain embodiments, the additional fragrance accords or compounds can be, but are not limited to, one or more aldehydic compound(s), one or more animalic compound(s), one or more balsamic compound(s), one or more citrus compound(s), one or more floral compound(s), one or more fruity compound(s), one or more gourmand compound(s), one or more green compound(s), one or more herbal compound(s), one or more marine compound(s), one or more mossy compound(s), one or more musk compound(s), one or more piney compound(s), one or more powdery compound(s), one or more spicy compound(s), one or more woody compound(s), one or more licorice compound(s), or combinations thereof.

Non-limiting examples of suitable aldehydic compounds include acetaldehyde C 8, acetaldehyde C-9, acetaldehyde C-10, adoxal, aldehyde C-8, aldehyde C-9, aldehyde C-10, aldehyde C-11, aldehyde C-12, aldehyde C-12 lauric, aldehyde C-12 MNA, aldehyde supra, cyclomyral trans-2-decenal, trans-4-decenal, cis-4-decenal, 9-decenal, myrac aldehyde, precyclemone B, trans-2-dodecenal, undecylenic aldehyde, 1-methyl-4-(4-methylpentyl)cyclohex-3-ene-1-carbaldehyde (VERNALDEHYDE®), and combinations thereof.

Non-limiting examples of an animalic compound are 5-Cyclohexadecen-1-one (AMBRETONE®), 17-oxacycloheptadec-6-en-1-one (ambrettolide), 2,5,5-trimethyl-1,3,4,4a,6,7-hexahydronaphthalen-2-ol (ambrinol), 2-Methyl-5-

(5,5,6-trimethylbicyclo[2.2.1]hept-2-yl)cyclohexanone (ALDRON®), civet, p-cresol, cresyl methyl ether, indole, skatole, and combinations thereof.

Non-limiting examples of a citrus compound are delta-3-carene, citral, citronellal, L-cintronellol, decanal, DH-L-citronellol, myrcenol, limonene, DH-myrcenol, nootkatone, sinensal, rhubafuran, bergamot oil, grapefruit oil, lemon oil, lime oil, orange oil, mandarin oil tridecene-2-nitrile, and/or yuzu core base.

Non-limiting examples of a floral compound are acetanisole, alpha amyl cinnamaldehyde, anisyl acetate, anisic aldehyde, benzyl acetate, bourgeonal, butyl acetate, hexyl cinammic aldehyde, 1-citrol, cyclamen aldehyde, cyclohexyl lactone, delta-damascone, 9-decen-1-ol, dimethyl benzyl carbinol, farnesal, 1-dihydrofarnesal, ethyl linalool, 1-farnesal, farnesol, 1-dihydrofarnesol, 3-(3-Isopropylphenyl)butanal (FLORHYDRAL®), 3-(4-ethylphenyl)-2,2-dimethylpropanal (floralozone), 4-methyl-2-(2-methylpropyl)oxan-4-ol (FLOROL®), geraniol, gernayl acetate, piperonal, methyl 3-oxo-2-pentylcyclopentaneacetate (Hedione®), 2-Methyl-3-(3,4-methylenedioxyphenyl)propanal (Heliobouquet), 1-(5,6,7,8-tetrahydronaphthalen-2-yl)ethanone (FLORANTONE®), 3-(4-Isobutyl-phenyl)-2-methylpropionaldehyde (SUZARAL®), hexyl cinnamaldehyde, hexyl salicylate, indole, alpha-ionone, beta-ionone, isopropoxy ethyl salicylate, methyl-2-((1S*,2R*)-3-oxo-2-pentylcyclopentyl)acetate (JASMODIONE®), cis-jasmone, 4-(4-hydroxy-4-methylpentyl)cyclohex-3-ene-1-carbaldehyde (KOVANOL®), laurinal, lilial, linalool, linalyl acetate, 2,4,6,-trimethyl-4-phenyl-1,3-dioxane (LOREXAN®), 2,4-Dimethyl-4,4a,5,9b-tetrahydroindeno[1,2-d][1,3]dioxine (Magnolan), (4-propan-2-ylcyclohexyl)methanol (Mayol), methyl dihydrojasomante, gamma-methyl ionone, methoxymelonal, methyl benzoate, 1-(4-Isopropyl-cyclohexyl) ethanol (Mugetanol), nerol, 1-(3-Methyl-benzofuran-2-yl)-ethanone (Nerolione), neryl acetate, orantha, L., 2-pentyl cyclopentanone, 2-cyclohexyl-2-cyclohexylideneacetonitrile (PEONILE®), phenoxanol, phenoxy ethyl isobutyrate, phenylacetaldehyde, phenyl ethyl alcohol, prenyl salicylate, rose oxide, rosephenone, rosyrane, suzaral, terpineol, undecavertol, 2,2,5-trimethyl-5-pentylcyclopentan-1-one (VELOUTONE®), yara yara, geranium oil, rose oil, lavender oil, ylang oil, and combinations thereof.

Non-limiting examples of a fruity compound are aldehyde C-16, allyl caproate, allyl cyclohexyl proprionate, allyl heptanoate, amyl acetate, benzaldehyde, CASSIS®, L-citronellyl acetate, L-citronellyl nitrile, 3a,4,5,6,7,7a-hexahydro-4,7-methano-1h-inden-5(or 6)-yl acetate (CYCLACET®), 3a,4,5,6,7,7a-hexahydro-1H-4,7-methanoinden-1-yl propanoate (CYCLAPROP®), damascenone, beta-decalactone, gamma-decalactone, diethyl malonate, dimethyl benzyl carbinol acetate, dimethyl benzyl carbinyl butyrate, dimethyl phenyl ethyl carbinol, dimethyl sulfide, γ-dodecalactone, ethyl acetate, ethyl butyrate, ethyl caproate, ethyl decadienotate, ethyl heptoate, ethyl-2-methylbutyrate, ethyl acetoacetate, ethyl methyl phenyl glycidate, ethyl propionate, 4-methyl-2-(2-methylpropyl)oxan-4-ol (FLOROL®), ethyl tricyclo [5.2.1.02.6] decan-2 carboxylate (FRUITATE®), hexyl acetate, hexyl isobutyrate, isoamyl acetate, 6-(pent-3-en-1-yl)tetrahydro-2H-pyran-2-one (Jasmolactone), ethyl 2-methylpentanoate (manzanate), 2,6-dimethylhept-5-enal (melonal), methyl anthranilate, methyl dioxolan, methyl heptyl ketone, gamma-nonalactone, 6-nonenol, gamma-octalactone, phenyl ethyl isobutyrate, prenyl acetate, raspberry ketone, methyl(2-((4S)-4-methyl-2-methylenecyclohexyl)propan-2-yl)sulfane (RINGONOL®), (1R,6S)-ethyl 2,2,6-trimethyl-clocloxehanecarboxylate (THESARON®), tolyl aldehyde, γ-undecalactone, 3,5,5-trimethylhexyl acetate (vanoris), (2-tert-butylcyclohexyl) acetate (verdox), nopyl acetate, and combinations thereof.

Non-limiting examples of a gourmand compound are angelica lactone-alpha, caprylic acid, coumarin, ethyl fraison, ethyl vanillin, ethyl maltol (e.g., VELTOL PLUS), filbertone, 4-hydroxy-2,5-dimethyl-3(2H)-furanone (FURANEOL®), guaiacol, maple furanone, 2-acetyl pyrazine, 2,5-dimethyl pyrazine, vanillin and combinations thereof.

Non-limiting examples of a green compound are allyl amyl glycolate, cyclogalbanate, 1-(5,5-dimethyl-1-cyclohexen-1-yl)-4-Penten-1-one (DYNASCONE®), galbanolene, galbanum, trans-2-hexenal, cis-3-hexenol, hexen-1-ol, cis-3-hexenyl acetate, cis-3-hexenyl butyrate, cis-3-hexenyl formate, cis-3-hexenyl salicylate, liffarome, 2-methoxy-2-methylheptane, methyl octine carbonate, neofolione, 2,6-nonadienal, (2R,4S)-2-methyl-4-propyl-1,3-oxathiane (OXANE®), octahydro-5-methoxy-4,7-methano-1H-indene-2-carboxaldehyde (SCENTENAL®), N-(5-methylheptan-3-ylidene)hydroxylamine (STEMONE®), styrallyl acetate, 2,4-dimethylcyclohex-3-ene-1-carbaldehyde (TRIPLAL®), undecavertol, vionil, violet methyl carbonate (e.g., VIOLET T), violet leaf extract, and combinations thereof.

Non-limiting examples of a licorice compound include anise, anethole, and combinations thereof.

Non-limiting examples of an herbal compound are anethol, bamboo ketone, canthoxal, carvacrol, carvone, 1., clary sage natural oil, cymene, p., Daikon Ether, 2,6-dimethylheptan-2-ol (DIMETOL®), menthol, methyl salicylate, thymol, natural basil oil, natural eucalyptus oil, eucalyptol, sweet natural fennel oil, natural cedar leaf oil, and combinations thereof.

Non-limiting examples of a marine compound are 8-methyl-1,5-benzodioxepin-3-one (Calone® 1951), 3-(4-ethylphenyl)-2,2-dimethylpropanal (floralozone), 4-tert-butylphenylacetonitrile (MARENIL®), 4-[(3E)-4,8-dimethylnona-3,7-dienyl]pyridine (MARITIMA®), myrac aldehyde, ultrazure, and combinations thereof.

Non-limiting examples of a musk compound are 17-oxacycloheptadec-6-en-1-one (ambrettolide), 5-Cyclohexadecen-1-one (AMBRETONE®), (3aR,5aS,9aS,9bR)-3a,6,6,9a-Tetramethyldodecahydronaphtho[2,1-b]furan (AMBROXAN), 2,2,6-trimethyl-alpha-propylcyclohexanepropanol (Dextramber), 16-oxacyclohexadecan-1-one (EXALTOLIDE®), galaxolide, ((12E)-1-oxacyclohexadec-12-en-2-one (habanolide), [2-[1-(3,3-dimethylcyclohexyl)ethoxy]-2-methylpropyl]propanoate (HELVETOLIDE®), (1'R)-3-methyl-5-(2,2,3-trimethylcyclopentan-1-yl)-2-pentanone, (5E)-3-methylcyclopentadec-5-en-1-one (MUSCENONE®), 1,4-dioxacycloheptadecane-5,17-dione (Musk T), 3-methylcyclopentadecan-1-one (L-muscone), 1-(1,1,2,6-tetramethyl-3-propan-2-yl-2,3-dihydroinden-5-yl)ethanone (TRASEOLIDE™), 1-(3,5,5,6,8,8-hexamethyl-6,7-dihydronaphthalen-2-yl)ethenone (TONALID®), and combinations thereof.

Non-limiting examples of a piney compound are 1-borneol, 1-bornyl acetate, camphene, camphor gum powder, dihydroterpineol, β-pinene, and combinations thereof.

Examples of a powdery compound include, without limitation, heliotropine and/or whiskey lactone (methyl octalactone).

Non-limiting examples of a spicy compound are acetyl isoeugenol, delta-caryophellene, cardamon oil, cinnamaldehyde, cuminaldehyde, eugenol, isoeugenol, perilla aldehyde, cardamom oil, clove oil, ginger extract, ginger oil, black pepper extract and combinations thereof.

Non-limiting examples of a woody and/or amber compound are amber core, amber extreme, ambretol, 4aR,5R,7aS,9R)-Octahydro-2,2,5,8,8,9a-hexamethyl-4H-4a,9-methanoazuleno[5,6-d]-1,3-dioxole (AMBROCENIDE®), ((3aR,5aS,9aS,9bR)-3a,6,6,9a-Tetramethyldodecahydronaphtho[2,1-b]furan (AMBROXAN), 2-ethyl-4-(2,2,3-trimethyl-3-cyclo-penten-1-yl)-2-buten-1-ol (BACDANOL®), ethoxymethoxycyclododecane (Boisambrene Forte), 1,1,2,3,3-pentamethyl-2,5,6,7-tetrahydroinden-4-one (Cashmeran®), ((2R,5S,7R,8R)-8-methoxy-2,6,6,8-tetramethyltricyclo[5.3.1.01,5]undecane (Cedramber®), cedanol, cedarwood oil, (1S,2R,5S,7R,8R)-2,6,6,8-tetramethyltricyclo[5.3.1.01,5]undecan-8-ol (Cedrol), 2,2,6-trimethyl-alpha-propylcyclohexanepropanol (Dextramber), 3-Methyl-5-(2,2,3-trimethyl-3-cyclopenten-1-yl)-4-penten-2-ol (EBANOL®), (R,E)-2-Methyl-4-(2,2,3-trimethylcyclopent-3-enyl) but-2-en-1-ol (HINDINOL®), hinokitiol, DH-ionone beta, [(1R,2S)-1-methyl-2-[[(1R,3S,5S)-1,2,2-trimethyl-3-bicyclo[3.1.0]hexanyl]methyl]cyclopropyl] methanol (JAVANOL®), 5-butan-2-yl-2-(2,4-dimethyl-1-cyclohex-3-enyl)-5-methyl-1,3-dioxane (karanal), 2,4-Dimethyl-2-(1,1,4,4-tetramethyltetralin-6-yl)-1,3-dioxolane (OKOUMAL®), 1-(1,2,3,4,5,6,7,8-octahydro-2,3,8,8-tatramethyl-2-naphthyl)ethan-1-one (ORBITONE®), 2-ethyl-4-[(1R)-2,2,3-trimethyl-3-cyclopenten-1-yl]-(2E)-buten-1-ol (LEVOSANDOL®), patchouly oil, polysantol, rhubofix, sandalwood, and combinations thereof.

In certain embodiments, the fragrance compositions can comprise one or more of the disclosed fragrance compounds through the use of essential oils containing such fragrance compounds. Likewise, fragrance accords can be compounds of essential oils or comprise essential oils. Essential oils are concentrated hydrophobic liquids containing volatile aromatic compounds from plants. Many essential oils can contain certain amounts of, for example, menthol, ionone, or other fragrance compounds disclosed herein.

Fragrance compositions of the present invention can contain or consist of at least one ingredient selected from a group consisting of a fragrance carrier and a fragrance base. Such compositions can also consist of at least one fragrance adjuvant.

Fragrance carriers can be a liquid or a solid and typically do not significantly alter the olfactory properties of the fragrance ingredients. Some non-limiting examples of fragrance carriers include an emulsifying system, encapsulating materials, natural or modified starches, polymers, gums, pectins, gelatinous or porous cellular materials, waxes, and solvents which are typically employed in fragrance applications.

Fragrance base refers to any composition comprising at least one perfuming co-ingredient. In general, these co-ingredients belong to chemical classes such as, but not limited to: alcohols, aldehydes, ketones, esters, ethers, acetals, oximes, acetates, nitriles, terpenes, saturated and unsaturated hydrocarbons, and essential oils of natural or synthetic origins.

The fragrance compositions according to the disclosed subject matter can be in the form of a simple mixture of the various co-ingredients and solvents, or also in the form of a biphasic system such as an emulsion or microemulsion. Such systems are well-known to persons skilled in the art.

Nonlimiting examples of such solvents used in perfumery are known in the art and include but are not limited to: dipropyleneglycol, diethyl phthalate, isopropyl myristate, benzyl benzoate, 2-(2-ethoxy)-1-ethanol, ethyl citrate, ethanol, water/ethanol mixtures, limonene or other terpenes, isoparaffins such as those known under the trademark Isopar® (ExxonMobil Chemicals, Houston, TX), and glycol ethers and glycol ether esters such as those known under the trademark Dowanol® (Dow Chemical Company, Midland, MI).

In certain specific embodiments, the presently disclosed subject matter can include a fragrance composition comprising an amount of one or more of the presently disclosed fragrance compounds sufficient to provide a concentration of said one or more compounds of at least 1 nanograms per cubic foot of air, at least 5 nanograms per cubic foot of air, at least 10 nanograms per cubic foot of air, at least 15 nanograms per cubic foot of air, at least 25 nanograms per cubic foot of air, at least 35 nanograms per cubic foot of air, or at least 50 nanograms per cubic foot of air.

4. Use of Compositions in Consumer Products

In certain embodiments, the compositions of the present disclosure are formulated as part of a consumer product. Such consumer products can be prepared in any suitable form by any process chosen by the formulator.

In some embodiments, the compositions of the presently disclosed subject matter relate to fragrance formulations, in which the compositions are blended as a sleep benefit effect-providing fragrance, and the resulting fragrance composition can be used in, for example, parfums, colognes, shampoos, rinses, skin cares, body shampoos, body rinses, body powders, air fresheners, deodorants, baths, and the like, if necessary in combination with auxiliary materials.

In certain embodiments, the consumer products of the present disclosure can be, but are not limited to, air care products (e.g., candles, aerosols, air fresheners, liquid electric air fresheners, fragrance diffusers, gel air fresheners, plug-in air fresheners, etc.); home care products (e.g., laundry detergents, softeners, cleaners, dryer sheets, etc.); personal care products for adults, kids or babies (e.g., lotions, creams, wipes, body washes, hand soaps, shampoos, conditioners, soaps, etc.); sanitary products (e.g., towels, toilet paper, tissue paper, wet tissue paper, handkerchiefs, wet towels, etc.); pet care products; fine fragrance (e.g., parfum, eau de parfum, colognes, eau de toilette, etc.); cosmetics (e.g., skin cream, cleansing cream, night cream, hand cream, lotion, after-shave lotion, body lotion, lip cream, talcum powder, anti-wrinkle and/or anti-aging cosmetics, massage oil, etc.); hair cosmetics (e.g., shampoo, rinse, conditioner, rinse in shampoo; hair styling agents; etc.); bath agents (e.g., powder bath additives, solid foaming bath additives, bath oils, bubble bath, bath salts, etc.); products for play (e.g., stuffed animals, dolls, etc.); bedding products (e.g., pillows, mattresses, mattress pads, etc); pharmaceuticals (e.g., plasters, ointments, suppositories, tablets, liquid medicines, capsules, granules, etc.).

In certain embodiments, the disclosed subject matter provides for use of the compositions described herein in a consumer product as described herein.

In certain embodiments, the compositions can be formulated as part of a product to increase the duration of time asleep during the night.

In certain embodiments, the compositions can be formulated as part of a product to decrease the duration of awake time during the night.

In certain embodiments, the compositions can be formulated as part of a product to increase the overall quantity of sleep (i.e., increase the duration of time asleep during the night and decrease the duration of awake time during the night.

In certain embodiments, the compositions can be formulated as part of a product which is sleep inducing or sedating.

In certain embodiments, the compositions can be formulated as part of a product to increase the duration of REM sleep.

In certain embodiments, the compositions can be formulated as part of a product to increase the duration of deep sleep.

In certain embodiments, the compositions can be formulated as part of a product to increase the overall efficiency of sleep as calculate by the formula:

$$\text{sleep efficiency} = \frac{100 * \text{total time asleep}}{\text{total time asleep} + \text{time awake} + \text{restless time during sleep}}.$$

In certain embodiments, the compositions can be formulated as part of a product to increase the overall duration and efficiency of sleep.

In certain embodiments, the compositions can be formulated as part of a product to improve one or more of total minutes awake, total minutes asleep, sleep efficiency, number of REM sleep minutes, number of light sleep minutes, and number of deep sleep minutes.

In certain embodiments, the subject disclosure relates to methods of incorporating compositions providing sleep-improving effects into a consumer product. In certain embodiments, methods can include (a) providing at least one consumer product, and (b) combining the consumer product with a composition comprising at least one, two, three, or four fragrance compounds. In certain embodiments, such a composition can be administered before the subject's typical bedtime.

In one embodiment, at least a composition comprising one, two, three, or four compounds can be added to a consumer product, such as an air care product, to increase the duration of sleep and/or improve quality of sleep in a subject using the product as compared to the duration of sleep of a subject using a consumer product which does not comprise the subject composition. For example, a composition comprising two compounds can be added to a consumer product, such as an air freshener, which is utilized by a subject before the subject's typical bedtime and effectively provides one or more sleep benefits to the subject.

The concentration of the composition admixed with the consumer product to provide one or more sleep benefits to a consumer can change based on a number of variables, for example, the specific consumer product, the physical form of the consumer product (e.g., liquid, gas, or solid) and what fragrance compounds are already present in the consumer product and the concentrations thereof.

A broad range of concentrations of the fragrance composition can be employed to provide one or more sleep benefits in a consumer. In certain embodiments of the present disclosure, the fragrance composition can be admixed with a consumer product and the composition can be present in the consumer product in an amount from about 1 to about 9000 ppm, or from about 5 to about 7500 ppm, or from about 10 to about 5000 ppm, or from about 50 to about 2500 ppm, or from about 100 to 1000 ppm, or from about 250 to 500 ppm, and any value in between.

In certain embodiments of the present disclosure, the fragrance composition can be admixed with a consumer product wherein the composition is present in an amount from about 0.0001% to about 90% by weight, or from about 0.001% to about 75% by weight, or from about 1% to about 50% by weight, or from about 5% to about 25% by weight, or from about 10% to about 15% by weight, and values in between.

In certain embodiments, the consumer product can additionally include one or more bases, solvents, and combinations thereof.

In certain embodiments, bases can include, but are not limited to, essential oils, lactones, aldehydes, alcohols, ketones, nitriles, esters, amides, oximes, and other fragrant compounds, and perfuming co-ingredients.

In certain embodiments, the solvents can include, but are not limited to, diproplyene glycol, propylene glycol, diethphthalate (DEP), diisononyl phthalate (DINP), benzyl benzoate, benzyl alcohol, iso propyl myristate (IPM), isopropyl palmitate (IPP/Deltyl Prime), butyl stearate, dioctyl adipate, triethyl citrate, methyl hydrogenated rosinate (CAS No. 8050-15-5), terpenes (e.g., Glidsol 100), paraffinic naphthenic solvent (e.g., LPA-170 Solvent), isoalkanes (e.g., Soltrol 170 Isoparaffin), isoparaffins, isooctadecanol (e.g., Tego Alkanol 66), phenoxyethanol, diethylene glycol monoethyl ether (Carbitol low gravity), glycol ether (Methyl Carbitol), Dipropylene Glycol Methyl Ether (e.g., Dowanol DPM), Dipropylene Glycol Methyl Ether Acetate (e.g., Dowanol DPMA), Propylene glycol methyl ether (e.g., Dowanol PM Glycol Ether), Tripropylene Glycol Methyl Ether, Diisoheptyl Phthalate (e.g., Jayflex® 77 available from Exxon), deionized or distilled water, specially denatured ethyl alcohol (e.g., SDA 40B), Dimethyl Adipate/Dimethyl Glutarate (e.g., DBE®-LVP Esters available from FLEXISOLV®), Racemic mixture (+/−)-2,2-dimethyl-4-hydroxymethyl-1,3-dioxolane (e.g., Augo Clean Multi Solvent), Alcohol 40B Anhydrous 200 Proof, alcohol SDA 40B 190 Proof, Triacetin, 3-Methoxy-3-methyl-1-butanol (Solfit), Benzyl Laurate, Tripropylene Glycol Methyl Ether (e.g., Dowanol TPM), Dipropylene glycol n-butyl ether (e.g., Dowanol DPNB), Dimethyl siloxane, trimethylsiloxy-terminated (e.g., Dowanol Corning 200 Fluid), Caprylic/Capric Triglycerides (e.g., Neobee M-5), propylene glycol and glyceryl oleate (e.g., Arlacel 186), Uniceth-IC20L (e.g., Arlasolve 200 L), propanediol, 1, 3, Butyl Cellosolve, Hexylene glycol, Glycerine, N Methyl Stearate, Isopropyl alcohol, 2-Methyl-1,3-propanediol (e.g., MP Diol Glycol), Diethyl Citrate, Triethyl Acetyl Citrate, Isopentyldiacetate (IPD-AC), Dimethyl 2-methylpentanedioate (e.g., Rhodiasolv Iris), medium chain triglicyrides (MTC), terpene hydrocarbons (e.g., Dipentene 5100), DL-limonene (e.g., Dipentene 122), 3,5,5-trimethylhexyl acetate, Diethyl Malonate, Limonene (e.g., Unitene D), cyclohexyl acetate, para-tertiary-butyl (e.g., Vertenex), Ethyl Acetate, and Diethyl Succinate.

In certain embodiments the consumer product can include, based on total consumer product weight from about 0.1% to about 99%, or from about 1% to about 80%, or from about 5% to about 55%, or from about 10% to about 50% of a solvent, said solvent can be selected from cyclopentasiloxane, ethanol, water, propylene glycol, dipropylene glycol, and mixtures thereof; and from 0% to 30%, or from 0% to 20%, or from 0.1% to 4%, or from 0.1% to 4% of a material selected from the group consisting of a structurant, a residue masker, an antimicrobial, and mixtures thereof.

In another embodiment, the consumer can include an ingredient selected from the group consisting of builders, chelating agents, dye transfer inhibiting agents, dispersants, enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, hueing dyes, fragrances, fragrance delivery systems, structure elasticizing agents, carriers, structurants, hydrotropes, processing aids, solvents in addition to said solubilizing agent, a fabric softener active selected from the group consisting of a silicone polymer, a polysaccharide, a clay, a fatty ester, a dispersible polyolefin, a polymer latex and mixtures thereof, pigments, and mixtures thereof.

In another specific embodiment, the consumer product can include, based on total consumer product weight from 0.1% to 99%, or from about 1% to about 80%, or from about 5% to about 70%, or from about 10% to about 50% of a solvent, where said solvent can be selected from, water, glycerin, and mixtures thereof; from about 0% to about 50%, or from about 0% to about 40%, or from about 0.1% to about 30%, or from about 0.1% to about 15% of a material selected from the group consisting of a structurant, a humectant, a surfactant, an antimicrobial, and mixtures thereof.

The fragrance compounds, accords, and compositions disclosed herein are suitable for use in air care compositions for use in air care devices. The term "air care device" includes any suitable surface that allows for at least some evaporation of volatile materials in any suitable size, shape, form, or configuration. Air care devices can be made from any suitable material providing for the evaporation of volatile materials, including without limitation: natural materials, man-made materials, fibrous materials, non-fibrous materials, porous materials, non-porous materials, and combinations thereof. One non-limiting example is a candle. Other examples of air care devices can include aerosol, air freshener, liquid electric air freshener, fragrance diffuser, gel air freshener, plug-in air freshener, plug-in oil, and wax melt.

Air care devices (such as, wicking devices) are known for dispensing volatile liquids into the atmosphere, such as fragrance, deodorant, disinfectant or insecticide active agent. A typical air care device utilizes a combination of a wick and emanating region to dispense a volatile liquid from a liquid fluid reservoir. Ideally, the air care device should require little or no maintenance and should perform in a manner that allows the volatile material to be dispensed at a steady and controlled rate into the designated area while maintaining its emission integrity over the life span of the device.

In certain embodiments, the air care composition can be incorporated into air fresheners. The air fresheners can include but are not limited to sprays, plug in products, gel-type air fresheners, membrane-type air fresheners, nebulizers, diffusers, and potpourris.

In a certain embodiment the air care composition described herein can be for use in an electrical liquid air freshener device. The term "electrical liquid air freshener device" or "liquid electrical air freshener" refers to device or system that includes an electrical or battery-operated source of energy which includes heated liquid wick delivery systems, piezoelectrical spraying systems, electrospray devices or Venturi devices. Commercial examples of electrical liquid air freshener devices include, but are not limited to, Glade PlugIns® Scented oil, sold by SC Johnson & Sons; Air Wick Scented Oils, and Air Wick X-Press® Scented Oils, sold by Reckitt Benckiser; Febreze Noticeables sold by Proctor & Gamble Co., Electric Home Air Fresheners, sold by the Yankee Candle Co.; and Renuzit Scented Oils, sold by Henkel AG. In another embodiment, the fragrance composition is admixed with a gel or wax to increase viscosity for use in a non-energized air freshener device.

In certain embodiments, candles can be paraffin wax candles, beeswax candles, soy-based candles, tallow candles, and gel candles. A candle can have a candle wick centrally positioned in the body of the candle. The candle can emanate an air care composition and achieve continuous delivery of a fragrance compound, accord, or composition.

In another suitable embodiment, the air care composition is an aerosol for spraying the air in a room or other enclosed area. Such aerosol compositions can contain alcoholic or aqueous preparations of fragrance compositions, a propellant, surfactants, emulsifiers, and preservatives.

In another aspect of the presently disclosed consumer product, said consumer product can be a home care product such as a cleaning and/or fabric or hard treatment composition that can include an ingredient selected from the group consisting of builders, chelating agents, dye transfer inhibiting agents, dispersants, enzymes, enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, hueing dyes, fragrances, fragrance delivery systems, structure elasticizing agents, carriers, structurants, hydrotropes, processing aids, solvents in addition to said solubilizing agent, a fabric softener active selected from the group consisting of a quarternary ammonium compound, a silicone polymer, a polysaccharide, a clay, an amine, a fatty ester, a dispersible polyolefin, a polymer latex and mixtures thereof, pigments and mixtures thereof, said composition can include an organic acid, such as but not limited to citric acid and/or lactic acid, hydrogenated castor oil, ethoxylated polyethleneimines, such as but not limited to PEI 600 EO 20 and/or PEI 600, an enzyme, such as but not limited to a cold water amylase, cold water protease and/or xylogluconase.

The fragrance compounds, accords, and compositions disclosed herein are particularly suitable for use in personal care compositions. Personal care compositions can include, but are not limited to, structurants (e.g., raw starch, such as corn, rice, potato, wheat and the like, carrageenan, xanthan gum, etc.), humectants (e.g., polyhydric alcohols, glycerin, etc.), fatty acids, inorganic salts (e.g., magnesium nitrate, trimagnesium phosphate, calcium chloride, sodium carbonate, sodium aluminum sulfate, disodium phosphate, sodium polymetaphosphate, sodium magnesium succinate, sodium tripolyphosphate, aluminum sulfate, aluminum chloride, aluminum chlorohydrate, aluminum-zirconium trichlorohydrate, aluminum-zirconium trichlorohydrate glycine complex, zinc sulfate, ammonium chloride, ammonium phosphate, calcium acetate, calcium nitrate, calcium phosphate, calcium sulfate, ferric sulfate, magnesium chloride, magnesium sulfate, and tetrasodium pyrophosphate, etc.), and antimicrobial agents (e.g., carbanilides, triclocarban, triclosan, a halogenated diphenylether, hexachlorophene, 3,4, 5-tribromosalicylanilide, and salts of 2-pyridinethiol-1-oxide, salicylic acid, etc.), or other actives (such as by non-limiting example, anti-dandruff actives). Personal care compositions can take on numerous forms. Suitable personal care compositions can include both rinse-off and solid form types.

Exemplary liquid rinse-off personal care compositions can include an aqueous carrier, such as water, which can be present at a level of from about 5% to about 95%, or from about 60% to about 85%. Non-aqueous carrier materials can also be employed. Such rinse-off personal care compositions can include one or more detersive surfactants. A representative, non-limiting, list of surfactants includes ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium lauryl sulfate, potassium laureth sulfate, sodium lauryl sarcosinate, sodium lauroyl sarcosinate, lauryl sarcosine, cocoyl sarcosine, ammonium cocoyl sulfate, ammonium lauroyl sulfate, sodium cocoyl sulfate, sodium lauroyl sulfate, potassium cocoyl sulfate, potassium lauryl sulfate, triethanolamine lauryl sulfate, triethanolamine lauryl sulfate, monoethanolamine cocoyl sulfate, monoethanolamine lauryl sulfate, sodium tridecyl benzene sulfonate, sodium dodecyl benzene sulfonate, sodium cocoyl isethionate, be sodium 3-dodecylaminopropionate, sodium 3-dodecylaminopropane sulfonate, sodium lauroamphoacetate, sodium cocoamphoacetate, disodium lauroamphoacetate disodium cocodiamphoacetate, and cocoamidopropyl betaine.

Rinse-off personal care compositions can also include a benefit agent. Non-limiting examples of suitable benefit agents can include petrolatum, glyceryl monooleate, castor oil, safflower oil, corn oil, walnut oil, peanut oil, olive oil, cod liver oil, almond oil, avocado oil, palm oil, sesame oil, vegetable oils, sunflower seed oil, soybean oil, vegetable oil derivatives, coconut oil and derivatized coconut oil, cottonseed oil and derivatized cottonseed oil, jojoba oil, cocoa butter, isopropyl palmitate, isopropyl myristate, cetyl riconoleate, stearyl riconoleate, hexyl laurate, isohexyl laurate, myristyl myristate, isohexyl palmitate, decyl oleate, isodecyl oleate, hexadecyl stearate, decyl stearate, isopropyl isostearate, diisopropyl adipate, diisohexyl adipate, dihexyldecyl adipate, diisopropyl sebacate, acyl isononanoate lauryl lactate, myristyl lactate, cetyl lactate, decaglyceryl distearate, decaglyceryl diisostearate, decaglyceryl monomyriate, decaglyceryl monolaurate, hexaglyceryl monooleate, and mixtures thereof.

Solid (i.e., non-flowing) personal care compositions can take many forms like powder, pellets, bars, etc, and can include convention soap, synthetic surfactants, or a mix of soap and synthetic surfactant.

The benefits of the fragrance compounds disclosed herein can be further enhanced by employing a delivery system, to apply such fragrance compounds. Such delivery systems include, but are not limited to, the following: polymer assisted delivery (PAD); matrix systems; reservoir systems (e.g., core-shell technology); molecule-assisted delivery (MAD); cyclodextrin (CD); starch encapsulated accord (SEA); and zeolite and inorganic carrier (ZIC). Suitable processes for employing such delivery systems are well known in the art.

In one aspect, a fragrance delivery system can be selected from the group consisting of a Polymer Assisted Delivery (PAD) system, Molecule-Assisted Delivery (MAD) system, Cyclodextrin (CD) system, Starch Encapsulated Accord (SEA) system, Zeolite & Inorganic Carrier (ZIC) system, wherein said fragrance delivery system can comprise a fragrance compound disclosed in the present disclosure. In certain embodiments, the fragrance delivery system comprising one or more fragrance compounds of the present invention can be employed in a consumer product.

5. Increase of Sleep Quantity and Quality

In certain embodiments, the compositions of the presently disclosed subject matter are administered in an amount effective to provide one or more sleep benefits to a subject. In a particular embodiment, the compositions of the presently disclosed subject matter are administered in an amount effective to provide one or more sleep benefits to a subject in need thereof, such as a person with clinical sleep problems.

5.1 Method for Monitoring Quantity or Quality of Sleep

Sleep quantity and/or sleep quality of a subject exposed to a fragrance can be monitored through the use of, without limitation, the following: polysomnography (PSG); wearable sleep and fitness monitoring devices, (e.g., devices sold under the brand names, Fitbit Ionic® Fitbit Charge 2®, Fitbit Alta HR®, Jawbone Up3®); non-wearable sleep trackers, such as those that utilize ballistocardiography (e.g., Emfit QS®), patented non-contact radio frequency technology to monitor breathing and body movement ((e.g., S+ by ResMed Personal Sleep Solution), mattress sensors (e.g., Beddit 3 Smart Sleep Monitor, Withings Aura Smart Sleep System, Sleepace Reston, etc.), EEG electrode headbands, wrist actigraphs (e.g., AMI MotionLogger), and combinations thereof.

The sleep quantity or sleep quality of a subject exposed to a fragrance composition of the present disclosure can be monitored in one embodiment using polysomnography (PSG).

Alternatively, the sleep quantity or sleep quality of subject exposed to a presently disclosed fragrance composition can be monitored through the use of wearable, activity monitoring devices, such as those sold under the brand name Fitbit®. Studies have demonstrated such field-based activity monitoring devices, including without limitation, those sold under the brand name Fitbit®, can be utilized as an alternative measurement of sleep time (i.e., quantity of sleep) and/or sleep efficiency (i.e., quality of sleep) for normal populations (i.e., populations with no known sleep disorders). Using PurePulse® heart rate tracker and sensitive motion detectors, Fitbit allows for measurements of time spent in each of the sleep stages, as well as time spent awake. The Fitbit brand family of devices have been shown to have a high intradevice reliability (see, for example, "Movement Toward a Novel Activity Monitoring Device", Sleep and Breathing, 2012).

5.2 Methods of Composition Administration

In certain embodiments of the present disclosure, the composition comprising one or more compounds of the present disclosure can be administered to a subject prior to the subject's typical bedtime. In a particular embodiment, the subject is exposed to the fragrance composition of the present disclosure for at least 20 seconds.

In certain non-limiting embodiments, the composition can be administered to a subject through gaseous or volatile form. In these embodiments, the composition can be administered intranasally or by inhalation. In certain embodiments, the subject can inhale the composition directly or indirectly.

In further embodiments, the composition can be administered via a consumer product. In one non-limiting example, the composition is admixed with a consumer product. The subject then uses the consumer product comprising the composition. Depending on the use of the consumer product, the subject is exposed to the fragrance.

In a specific embodiment, the composition can be released into the area surrounding the subject and the subject then inhales the composition. In one non-limiting example, the composition is released into the air by a consumer product, such as but not limited to an air freshener or a candle, or by bed linens treated with one or more laundry care products, such as laundry detergent, fabric softeners, laundry fragrance extenders, and the like.

In certain embodiments of the present disclosure, the amount of the composition released from the consumer product can be less than the total concentration of the composition admixed with the consumer product. In certain embodiments, the amount of the composition released by the consumer product, and therefore available for administration to the subject, can be between about 1% and 100% of the amount of composition admixed with the consumer product. In further embodiments, the amount of composition released can be between about 5% and about 90%, between about 10% and about 80%, between about 20% and about 70%, between about 30% and about 60%, and between about 40% and about 50% of the amount of composition admixed with the consumer product.

In certain specific embodiments, the presently disclosed subject matter can include a consumer product comprising a sufficient amount of at least one of the presently disclosed fragrance compounds to provide a concentration of said at least one compound of at least about 1 nanograms per cubic foot of air, at least about 5 nanograms per cubic foot of air, at least about 10 nanograms per cubic foot of air, at least about 25 nanograms per cubic foot of air, or at least about 50 nanograms per cubic foot of air.

A method of providing a sleep benefit to a subject in need thereof comprising using any of the disclosed consumer products in an amount effective to increase the quality or quantity of sleep in the subject when exposed to such consumer product prior to bedtime, at bedtime, and/or after bedtime is also disclosed herein. In one suitable embodiment, the subject can be exposed to the consumer product for at least about 15 minutes, at least about 30 minutes, at least about 1 hour, at least about 2 hours, at least about 3 hours, at least about 4 hours, at least about 5 hours, at least about 6 hours, or at least about 7 hours.

EXAMPLES

The present application is further described by means of the examples, presented below, wherein the abbreviations have the usual meaning in the art.

The use of such examples is illustrative only and does not limit the scope and meaning of the disclosed subject matter or of any exemplified term. Likewise, the disclosed subject matter is not limited to any particular preferred embodiments described herein. Indeed, many modifications and variations of the disclosed subject matter are apparent to those skilled in the art upon reading this specification. The disclosed subject matter is therefore to be limited only by the terms of the appended claims along with the full scope of equivalents to which the claims are entitled.

Example 1

Active Compounds Effective for Increasing the Quantity or Quality of Sleep

A series of sleep studies were conducted. Each study runs one week with one additional week for blank control sample (no fragrance). The number of panelists in each study ranged from 9 to 15. Panelists received either a set of control jars or a set of jars with test material (0.06 g neat oil on a blotter). The second week the order was reversed such that at the end of each study, each panelist had received both treatments.

Panelists did not take any kind of sleep aids or medications affecting sleep, were in good health, and without erratic sleep patterns or schedules. Each night, when ready to go to sleep, panelists were instructed to open one of the jars, hold it under their nose, and smell the fragrance while counting slowly to 20, then leave the jar open on the night table while sleeping. Fitbit sleep data were collected at the end of each session of each study and analyzed by ANOVA.

This Example 1 provides the results of the studies described above, disclosing compounds that demonstrated a change in quantity and/or quality of sleep in the test panelists.

Table 1 summarizes the increase in quantity and quality of sleep of panelists exposed to fragrance compounds of the present disclosure as compared to the Control as demonstrated by one or more of total minutes awake, total minutes asleep, sleep efficiency, number of REM sleep minutes, number of light sleep minutes, and number of deep sleep minutes.

TABLE 1

| Tested Active Compound | Total minutes awake % Decrease | Total minutes asleep % Increase | Sleep efficiency % Increase | Total REM sleep minutes % Increase | Total light sleep minutes % Increase | Total deep sleep minutes % Increase | Number of panelists (n) |
|---|---|---|---|---|---|---|---|
| Ambretone | — | — | — | — | 4 | — | 12 |
| Ambroxan | 8 | — | — | — | — | — | 13 |
| Cyclamen aldehyde | 7 | 4 | 1.2 | — | — | 7.4 | 12 |
| Dihydromyrcenol | — | 13 | — | 10 | — | 37 | 9 |
| Geraniol | — | 10 | — | — | 8 | 29 | 10 |
| cis-3-hexenyl salicylate | — | — | — | — | — | 8 | 10 |
| alpha-ionone | — | 5 | — | — | — | 14 | 13 |
| beta-ionone | 12 | — | 2 | — | 3 | — | 14 |
| Lilial | — | 4 | 1 | 6 | 5 | — | 9 |
| Linalool | — | — | — | — | 5 | — | 12 |
| Linalyl acetate | 10.6 | — | 2 | 19 | — | 16 | 14 |
| L-menthol | — | — | 1 | — | 3 | — | 11 |
| gamma-methyl ionone | — | — | — | — | 12 | — | 15 |

TABLE 1-continued

| Tested Active Compound | Total minutes awake % Decrease | Total minutes asleep % Increase | Sleep efficiency % Increase | Total REM sleep minutes % Increase | Total light sleep minutes % Increase | Total deep sleep minutes % Increase | Number of panelists (n) |
|---|---|---|---|---|---|---|---|
| L-muscone | — | — | — | — | — | 11 | 12 |
| Musk T | 13 | — | 2 | — | — | — | 15 |
| Nerol | — | 4 | — | — | 4 | — | 12 |
| Phenoxyethyl isobutyrate | — | — | — | — | 8 | — | 14 |
| Vanillin | — | — | — | 7 | — | — | 11 |

Example 2

Fragrance accords 1-8 were prepared using the presently disclosed fragrance compounds as shown in Table 2.

TABLE 2

| FRAGRANCE CATEGORY | Accord 1 | Accord 2 | Accord 3 | Accord 4 | Accord 5 | Accord 6 | Accord 7 | Accord 8 |
|---|---|---|---|---|---|---|---|---|
| hexenyl salicylate | 2.63 | 14.0 | 5.7 | 22.0 | 6.0 | 5.0 | 18.0 | 12.0 |
| beta-ionone | — | 5.0 | — | 5.0 | 5.0 | — | 15.0 | 22.0 |
| Musk Compounds | 0.07 | 27.0 | 19.8 | 25.0 | 36.0 | 0.33 | 2.0 | 34.0 |
| Floral Compounds | 70.35 | 33.0 | 18.8 | 40.0 | 38.0 | 42.34 | 60.0 | 30.0 |
| Citrus Compounds | 7.94 | 11.0 | 4.9 | 3.0 | — | — | — | — |
| Spicy Compounds | 0.54 | 5.0 | — | 5.0 | 10.0 | — | — | — |
| Gourmand Compounds | 5.27 | 2.0 | 1.1 | — | 2.0 | — | — | 2.0 |
| Fruity Compounds | 1.84 | — | 6.5 | — | — | 5.33 | — | — |
| Woody Compounds | 10.57 | — | 25.9 | — | — | 43.33 | 5.0 | — |
| Herbal Compounds | 0.54 | — | 1.0 | — | — | — | — | — |
| Mentholic Compounds | 0.25 | 3.0 | — | — | 3.0 | — | — | — |
| Aldehydic Compounds | — | — | — | — | — | 3.67 | — | — |
| Balsamic Compounds | — | — | 16.3 | — | — | — | — | — |
| Total | 100 | 100 | 100 | 100 | 100 | 100 | 100 | 100 |

A sleep study (n=9 to n=15) as described in Example 1 was conducted to test the fragrance accords of Example 11. The fragrance accord 1 provided an increase in the total minutes of deep sleep, reduced number of total minutes awake and improved sleep efficiency. The fragrance accord 2 provided reduced number of total minutes awake and improved sleep efficiency. The fragrance accord 3 provided an increase in the total minutes of deep sleep. The fragrance accord 4 provided reduced number of total minutes awake and improved sleep efficiency. The fragrance accord 5 provided an increase in total minutes asleep, and number of light sleep minutes and improved sleep efficiency. The fragrance accord 6 provided an increase in deep sleep minutes and total minutes asleep. The fragrance accord 7 provided increased number of light sleep minutes and improved sleep efficiency. The fragrance accord 8 provided increased number of light sleep minutes.

Example 3

Fragrance accords 9-12 were prepared using the presently disclosed fragrance compounds as shown in Table 3.

TABLE 3

| FRAGRANCE CATEGORY | Accord 9 | Accord 10 | Accord 11 | Accord 12 |
|---|---|---|---|---|
| beta-ionone | 24.0 | 6.0 | 3.0 | 3.0 |
| Musk Compounds | 20.0 | 40.0 | 27.0 | 27.0 |
| Floral Compounds | 45.0 | 50.0 | 47.0 | 47.0 |
| Citrus Compounds | 11.0 | 1.0 | 1.0 | — |
| Spicy Compounds | — | 3.0 | 16.0 | 16.0 |

TABLE 3-continued

| FRAGRANCE CATEGORY | Accord 9 | Accord 10 | Accord 11 | Accord 12 |
|---|---|---|---|---|
| Balsamic Compounds | — | — | 6.0 | 6.0 |
| Solvent | — | — | — | 1 |
| Total | 100 | 100 | 100 | 100 |

A sleep study (n=12 to n=17) as described in Example 1 was conducted to test the fragrance accords of Example 12. The fragrance accord 9 provided an increase total minutes of sleep, total minutes of REM sleep and total minutes of deep sleep. The fragrance accord 10 provided an increase total minutes of deep sleep. The fragrance accord 11 provided an increase in total minutes of sleep, total minutes of deep sleep and improved sleep efficiency. The fragrance accord 12 provided an increase total minutes asleep, increased number of light sleep minutes, reduced number of total minutes awake and improved sleep efficiency.

Example 4

Fragrance accords 13-14 were prepared using the presently disclosed fragrance compounds as shown in Table 4.

TABLE 4

| FRAGRANCE CATEGORY | Accord 13 | Accord 14 |
|---|---|---|
| Nectaryl | 3.33 | 40.0 |
| beta-ionone | 6.67 | — |
| Citrus Compounds | 0.33 | — |
| Floral Compounds | 35.0 | 20.0 |
| Fruity Compounds | 53.0 | — |
| Aldehydic Compounds | 0.67 | — |
| Gourmand Compounds | 1.0 | — |
| Mentholic Compounds | — | 4.0 |
| Piney Compounds | — | 30.0 |
| Herbal Compounds | — | 6.0 |
| Total | 100 | 100 |

A sleep study (n=14 to n=15) as described in Example 1 was conducted to test the fragrance accords of Example 13. The fragrance accord 13 provided reduced number of minutes awake and improved sleep efficiency. The fragrance accord 14 provided an increase in number of deep sleep minutes.

Example 5

Fragrance accords 15-16 were prepared using the presently disclosed fragrance compounds as shown in Table 5.

TABLE 5

| FRAGRANCE CATEGORY | Accord 15 | Accord 16 |
|---|---|---|
| beta-ionone | 13.33 | 13.33 |
| Spicy Compounds | 3.66 | — |
| Floral Compounds | 70 | — |
| Mentholic Compounds | 9.67 | 9.67 |
| Gourmand Compounds | 3.33 | 3.33 |
| Solvent | — | 73.67 |
| Total | 100 | 100 |

A sleep study (n=15 to n=26) as described in Example 1 was conducted to test the fragrance accords of Example 14. The fragrance accord 15 provided an increase in number of deep sleep minutes and REM minutes. The fragrance accord 16 provided an increased number of total sleep minutes, REM minutes, reduced number of total minutes awake and improved sleep efficiency.

Example 6

Fragrance accord 17 was prepared using the presently disclosed fragrance compounds as shown in Table 6.

TABLE 6

| FRAGRANCE CATEGORY | Accord 17 |
|---|---|
| Musk Compounds | 36.0 |
| Floral Compounds | 42.0 |
| Citrus Compounds | 12.0 |
| Balsamic Compounds | 10.0 |
| Total | 100 |

A sleep study (n=10) as described in Example 1 was conducted to test the fragrance accord 17. The fragrance accord 17 provided an increased number of REM minutes, deep sleep minutes and total minutes asleep.

Example 7

Fragrance accord 18 was prepared using the presently disclosed fragrance compounds as shown in Table 7.

TABLE 7

| FRAGRANCE CATEGORY | Accord 18 |
|---|---|
| Hexenyl salicylate | 28 |
| Beta-ionone | 38 |
| Floral Compounds | 30 |
| Mentholic Compounds | 3 |
| Woody Compounds | 7 |
| Total | 100 |

A sleep study (n=14) as described in Example 1 was conducted to test the fragrance accord 18. The fragrance accord 18 provided a reduced number of total minutes awake and increased sleep efficiency.

Example 8

An aromatic herbal floral lavender perfume composition containing accord 1 was prepared from the presently disclosed fragrance compounds as shown in Table 8. The fragrance composition can be used in various consumer products and is particularly suitable for use in a body mist or body oil.

TABLE 8

| FRAGRANCE CATEGORY | Weight % |
|---|---|
| Accord 1 | 31.71 |
| aldehydic | 0.29 |
| citrus | 0.17 |
| floral | 17.29 |
| gourmand | 0.63 |
| green | 0.67 |

TABLE 8-continued

| FRAGRANCE CATEGORY | Weight % |
|---|---|
| herbal | 1.88 |
| licorice | 0.04 |
| marine | 0.17 |
| minty | 0.04 |
| musk | 13.33 |
| powdery | 0.83 |
| solvent/slight alcoholic | 31.53 |
| spicy | 0.63 |
| woody | 0.79 |
| TOTAL | 100.00 |

A sleep study (n=14) as described in Example 1 was conducted to test the fragrance composition of Example 8. The fragrance composition provided an increase in the total minutes asleep, as well as the minutes of REM sleep and deep sleep.

Example 9

An floral musk perfume composition was prepared from accord 3 of Example 2 and additional presently disclosed fragrance compounds as shown in table 9.

TABLE 9

| FRAGRANCE COMPONENTS | Weight % |
|---|---|
| Accord 3 | 61.01 |
| aldehydic | 0.14 |
| animalic | 0.21 |
| balsamic | 0.28 |
| floral | 28.77 |
| fruity | 0.98 |
| gourmand | 0.14 |
| green | 1.61 |
| herbal | 0.14 |
| phenolic | 0.21 |
| piney | 0.35 |
| spicy | 5.04 |
| woody | 0.07 |
| Solvent | 1.05 |
| TOTAL | 100 |

A sleep study (n=10) as described in Example 1 was conducted to test the fragrance composition of Example 9. The fragrance composition provided an increase in the total minutes of both REM sleep and deep sleep.

Although the presently disclosed subject matter and its advantages have been described in detail, it should be understood that various changes, substitutions and alterations can be made herein without departing from the spirit and scope of the disclosed subject matter as defined by the appended claims. Moreover, the scope of the present disclosure is not intended to be limited to the particular embodiments of the process, machine, manufacture, composition of matter, means, methods and steps described in the specification. As one of ordinary skill in the art will readily appreciate from the disclosure of the presently disclosed subject matter, processes, machines, manufacture, compositions of matter, means, methods, or steps, presently existing or later to be developed that perform substantially the same function or achieve substantially the same result as the corresponding embodiments described herein can be utilized according to the presently disclosed subject matter. Accordingly, the appended claims are intended to include within their scope such processes, machines, manufacture, compositions of matter, means, methods, or steps.

Patents, patent applications publications product descriptions, and protocols are cited throughout this application the disclosures of which are incorporated herein by reference in their entireties for all purposes.

What is claimed is:

1. A method of improving at least one sleep parameter of a subject, wherein the method comprises:
   providing a fragrance accord; and
   administering the fragrance accord to the subject in an amount effective to improve the at least one sleep parameter;
   wherein the fragrance accord comprises:
      i) beta-ionone in an amount of from about 15% to about 30% by weight,
      ii) at least one floral compound in an amount of from about 10% to about 60% by weight, and
      iii) one musk compound, wherein the musk compound is selected from the group consisting of (3aR,5aS,9aS,9bR)-3a,6,6,9a-tetramethyl-2,4,5,5a, 7,8,9,9b-octahydro-1H-benzo[e][1]benzofuran, 5-cyclohexadecen-1-one, L-muscone, (12E)-1-oxacyclohexadec-12-en-2-one, and 1,4-dioxacycloheptadecane-5,17-dione; and
   wherein the at least one sleep parameter is selected from the group consisting of a decrease in number of total minutes awake, an increase in total minutes asleep, an increase in sleep efficiency, an increase in the number of REM sleep minutes, an increase in the number of light sleep minutes, and an increase in the number of deep sleep minutes.

2. The method of claim 1, wherein the floral compound is selected from the group consisting of myrcenol, ionone alpha, linalool, linalyl acetate, cyclamen aldehyde, dihydromyrcenol, lilial, geraniol, gamma-methyl ionone, nerol, phenylethyl alcohol, and methyl 3-oxo-2-pentylcyclopentaneacetate.

3. The method of claim 1, wherein the musk compound is selected from the group consisting of (3aR,5aS,9aS,9bR)-3a,6,6,9a-tetramethyl-2,4,5,5a, 7,8,9,9b-octahydro-1H-benzo[e][1]benzofuran, 5-cyclohexadecen-1-one, L-muscone, and 1,4-dioxacycloheptadecane-5,17-dione; and
   wherein the floral compound is selected from the group consisting of myrcenol, ionone alpha, linalool, linalyl acetate, cyclamen aldehyde, dihydromyrcenol, lilial, geraniol, gamma-methyl ionone, nerol, phenylethyl alcohol, and methyl 3-oxo-2-pentylcyclopentaneacetate.

4. The method of claim 1, wherein the fragrance accord further comprises one or more citrus, spicy, mentholic, fruity, woody, aldehydic, herbal, balsamic, or gourmand compounds.

5. The method of claim 2, wherein the floral compound is selected from the group consisting of linalool, methyl 3-oxo-2-pentylcyclopentaneacetate, cyclamen aldehyde, geraniol, and phenylethyl alcohol.

6. The method of claim 1, wherein the musk compound is selected from the group consisting of 5-cyclohexadecen-1-one, and 1,4-dioxacycloheptadecane-5,17-dione.

7. The method of claim 3, wherein the floral compound is selected from the group consisting of linalool, methyl 3-oxo-2-pentylcyclopentaneacetate, cyclamen aldehyde, geraniol, and phenylethyl alcohol; and wherein the musk compound is selected from the group consisting of 5-cyclohexadecen-1-one and 1,4-dioxacycloheptadecane-5,17-dione.

8. A consumer product comprising a fragrance accord, wherein the fragrance accord comprises:
  i) beta-ionone in an amount of from about 15% to about 30% by weight,
  ii) at least one floral compound in an amount of from about 10% to about 60% by weight, and
  iii) one musk compound, wherein the musk compound is selected from the group consisting of (3aR,5aS,9aS,9bR)-3a,6,6,9a-tetramethyl-2,4,5,5a,7,8,9,9b-octahydro-1H-benzo[e][1]benzofuran, 5-cyclohexadecen-1-one, L-muscone, (12E)-1-oxacyclohexadec-12-en-2-one, and 1,4-dioxacycloheptadecane-5,17-dione.

9. The consumer product of claim 8, wherein the fragrance accord is provided at least in part by a fragrance delivery system,
  wherein said fragrance delivery system is selected from the group consisting of a Polymer Assisted Delivery (PAD) system, a Molecule-Assisted Delivery (MAD) system, a Cyclodextrin (CD) system, a Starch Encapsulated Accord (SEA) system, and a Zeolite & Inorganic Carrier (ZIC) system.

* * * * *